United States Patent
Fries et al.

(10) Patent No.: US 7,657,917 B2
(45) Date of Patent: Feb. 2, 2010

(54) INTERACTIVITY EMULATOR FOR BROADCAST COMMUNICATION

(75) Inventors: Robert M. Fries, Redmond, WA (US); Chia-Chi Teng, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1296 days.

(21) Appl. No.: 10/154,878

(22) Filed: May 23, 2002

(65) Prior Publication Data

US 2003/0221197 A1 Nov. 27, 2003

(51) Int. Cl.
*H04N 7/173* (2006.01)
(52) U.S. Cl. .................. 725/117; 725/118; 725/112
(58) Field of Classification Search ................. 725/117, 725/116, 114, 111, 100, 135, 146, 118, 112; 348/724
See application file for complete search history.

(56) References Cited

U.S. PATENT DOCUMENTS

| | | | |
|---|---|---|---|
| 6,282,548 B1 * | 8/2001 | Burner et al. ............ 707/104.1 |
| 6,459,427 B1 * | 10/2002 | Mao et al. ................... 725/109 |
| 6,574,609 B1 * | 6/2003 | Downs et al. ................. 705/50 |
| 6,785,704 B1 * | 8/2004 | McCanne .................... 718/105 |
| 7,013,479 B2 * | 3/2006 | Mori ............................ 725/93 |
| 7,079,176 B1 * | 7/2006 | Freeman et al. .......... 348/207.1 |
| 2001/0013123 A1 * | 8/2001 | Freeman et al. ............... 725/34 |
| 2002/0161673 A1 * | 10/2002 | Lee et al. ....................... 705/27 |
| 2002/0188943 A1 * | 12/2002 | Freeman et al. ............... 725/38 |
| 2004/0031052 A1 * | 2/2004 | Wannamaker et al. ......... 725/61 |
| 2004/0073630 A1 * | 4/2004 | Copeland et al. ............ 709/218 |
| 2004/0261127 A1 * | 12/2004 | Freeman et al. ............. 725/135 |

FOREIGN PATENT DOCUMENTS

KR       2002037432 A   *   5/2002

* cited by examiner

*Primary Examiner*—Joseph P Hirl
*Assistant Examiner*—Jivka Rabovianski
(74) *Attorney, Agent, or Firm*—Lee & Hayes, PLLC (57) ABSTRACT

Described herein is a technology for in the realm of digital video broadcast technology or other such technology. One implementation, described herein, relates to broadcasting web content to client devices in a DVB (digital video broadcast) environment using rotational sequences of data modules (e.g., DSMCC carousels). One implementation, described herein, relates to emulating an interactive browsing experience of web content over a broadcast channel. One implementation, described herein, relates to the client device "smartly" caching select portions of the web content being broadcast. The scope of the present invention is pointed out in the appending claims.

25 Claims, 5 Drawing Sheets

INTERACTIVITY EMULATOR FOR BROADCAST COMMUNICATION

TECHNICAL FIELD

This invention is generally in the realm of digital video broadcast technology or other such technology.

BACKGROUND

In a digital video broadcasting (DVB) setting, a client device receives a digital broadcast of video and other data from a server device across a broadcast network. A client device may also be called a broadcast receiver, a set-top box, and the like. The server device may also be called a broadcaster or content distributor.

DVB standards and other digital video compression/transmission schemes (such as MPEG-2) include a protocol for broadcasting rotational sequences of data modules, which may be called "carousels." An example of one such protocol is DSMCC (Digital Storage Media Command and Control).

Broadcasting Carousels

A carousel is a mechanism for delivering blocks of data over a one-way (e.g., broadcast) network. The blocks of data are called modules. These modules are repeatedly rebroadcast over and over again. Hence, the term "carousel." A carousel may also be called a rotational sequence of modules.

Primarily, DSMCC is a protocol for controlling a video-on-demand (VOD) server and providing data and object carousels. It designed for receivers (e.g., clients) to fetch select data received from a sender (e.g., server).

Clients are, in general, devices such as set top boxes that consume multi-media content. Servers are entities that provide multi-media content and services. A Server may be a distributed system and contain multiple computing platforms, some functionally specialized e.g. video pumps to provide video-on-demand service.

The DSMCC carousel protocol makes use of non-flow-controlled download messages to provide periodic broadcast of data to a set of receivers. A download control message provides a list of available modules from a particular data carousel so that each receiver can identify which modules it wishes to capture. Since for the data carousel case, no reverse channel from receiver to sender is present, it is assumed that all data transfer parameters have been agreed upon a priori, and that the receiver knows on which broadcast channel to start listening for download control and data messages.

Object carousels, specifically, are a more structured form of the DSMCC data carousels. The content of the modules of an object carousel are identified to the broadcast receiver. Examples of identified objects include files, directory, images, sound, etc.

DSMCC carousels are well-known to those of ordinary skill in the art.

Broadcast Communications

Typically, communications networks may be classified as either one-way or two-way. With a one-way network, communication occurs only in one direction: From the source to the receiver with no return channel of communications (or a limited one). With a two-way network, communication occurs freely in both directions, more or less, without limitation.

A one-way network is often called a "broadcast" network. A broadcast network is one that primarily "broadcasts" (e.g., transmits) information to consumers of that signal. A satellite network is an example of a typical broadcast network. A conventional cable network is one-way; however, some are two-way. Typically, DVB is over a broadcast network. A ubiquitous example of a two-way network is the Internet. Also, local area networking (LAN) and wide area networking (WAN) are other examples.

Interactivity

With two-way communications, it is possible for the nodes (e.g., server or client) on either end of the communications network to interact with each other. Being interactive may be that which relates to a two-way electronic or communications system in which response is relatively direct and continual.

It is rather straightforward to implement interactivity via a two-way network. Browsing the web involves interactivity between the user of the web browser and the web servers.

However, true interactivity between two nodes on the network is not possible on a true one-way network. Even if it is possible via a slow or delayed backchannel, true interactivity is not practical because the delay of the backchannel does not provide a mechanism for relatively direct and continual responses between nodes.

Accordingly, it is a challenge to provide internet-like (e.g., hypertext or web) interactivity for users of client devices over a broadcast communications network.

SUMMARY

Described herein is a technology in the realm of digital video broadcast technology or other such technology.

One implementation, described herein, relates to broadcasting web content to client devices in a DVB (digital video broadcast) environment using rotational sequences of data modules (e.g., DSMCC carousels). One implementation, described herein, relates to emulating an interactive browsing experience of web content over a broadcast channel. One implementation, described herein, relates to the client device "smartly" caching select portions of the web content being broadcast.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of present invention, thereby better explain the present invention. Furthermore, for ease of understanding, certain method steps are delineated as separate steps; however, these separately delineated steps should not be construed as necessarily order dependent in their performance.

The following description sets forth one or more exemplary implementations of an Interactivity Emulator for Broadcast Communication that incorporate elements recited in the appended claims. These implementations are described with specificity in order to meet statutory written description, enablement, and best-mode requirements. However, the description itself is not intended to limit the scope of this patent.

The inventors intend these exemplary implementations to be examples. The inventors do not intend these exemplary implementations to limit the scope of the claimed present invention. Rather, the inventors have contemplated that the claimed present invention might also be embodied and implemented in other ways, in conjunction with other present or future technologies.

An example of an embodiment of an Interactivity Emulator for Broadcast Communication may be referred to as an "exemplary interactivity emulator."

Introduction

Figure 1:
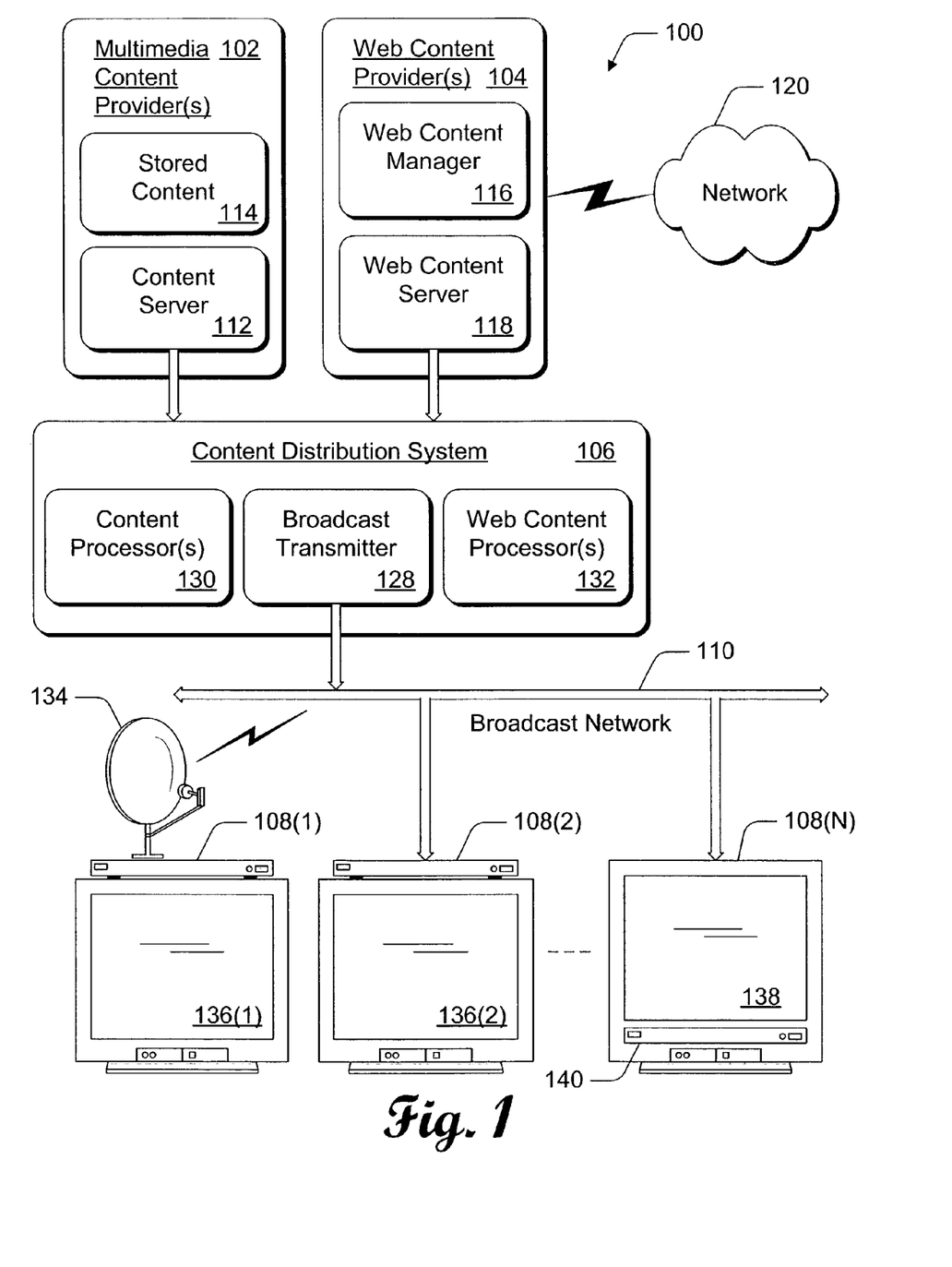
FIG. 1 illustrates exemplary environment in which an implementation described herein may be employed.
Figure 2:
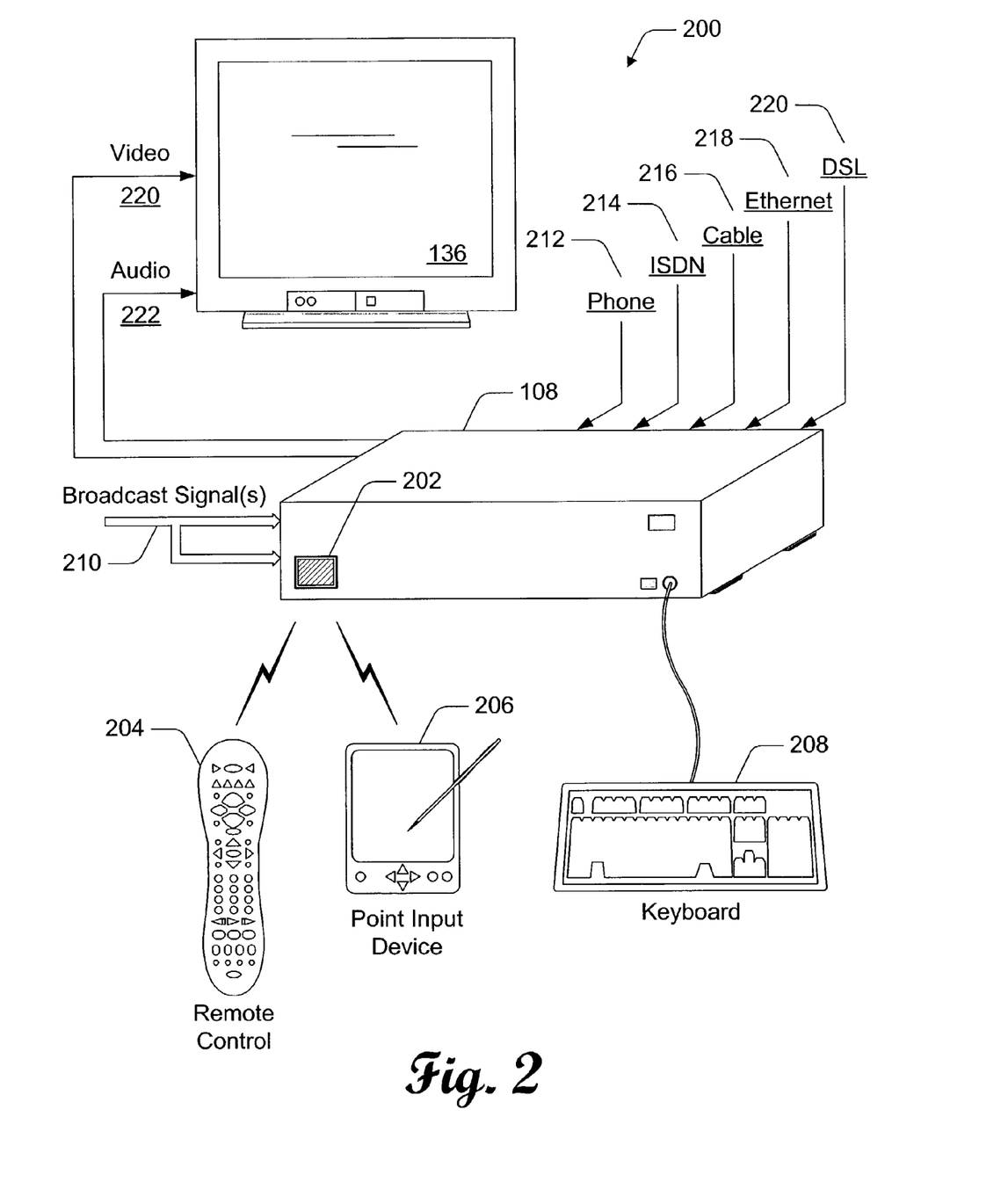
FIG. 2 illustrates of an example client device, a television, and various input devices that interact with the client device.
Figure 3:
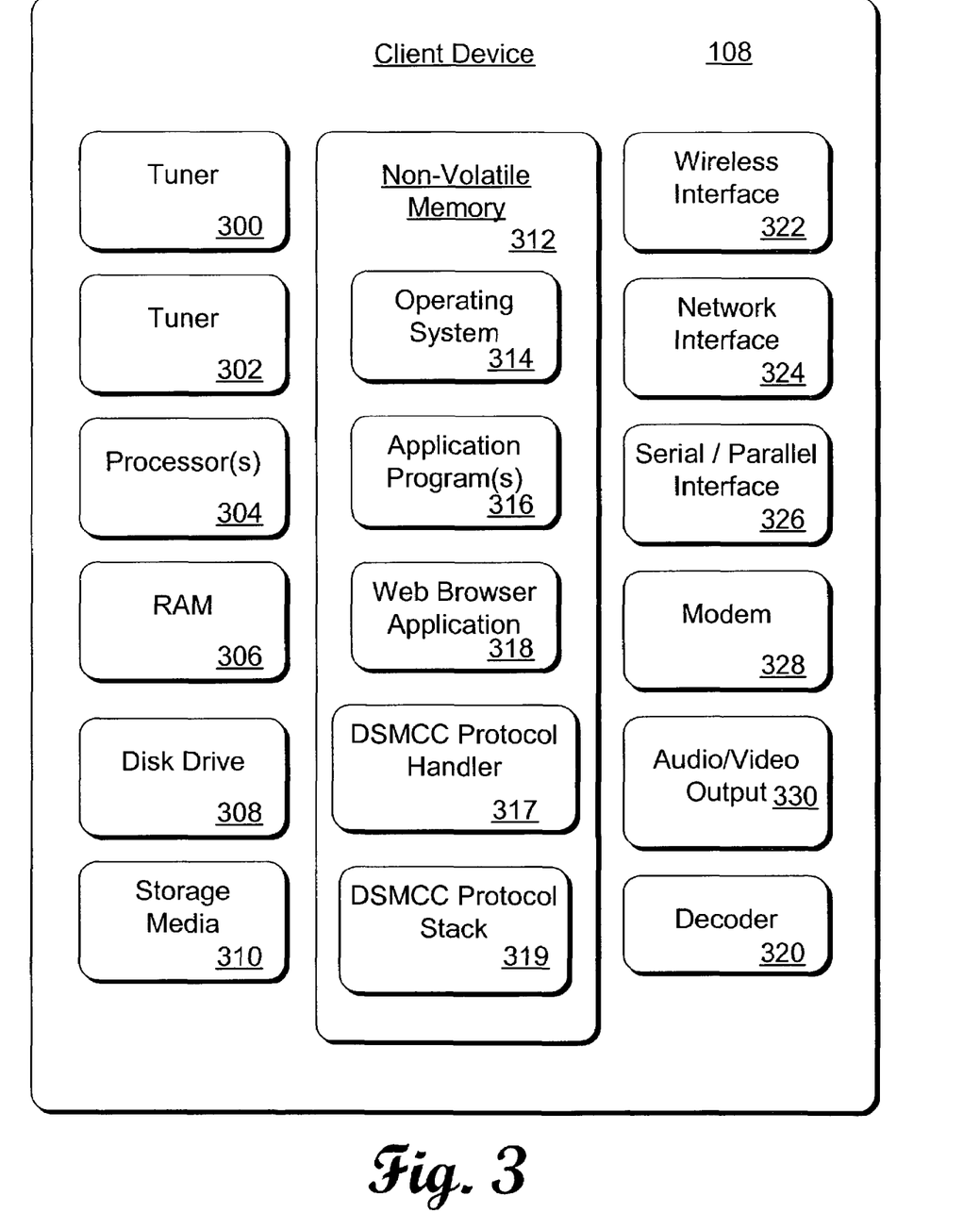
FIG. 3 is a block diagram that illustrates components of the example client device(s) shown in FIGS. 1 and 2

The exemplary interactivity emulator may be implemented (partially or wholly) on systems, devices, and/or communications networks like that show in FIGS. 1 through 3.

One implementation, described herein, relates to broadcasting web content to client devices in a DVB (digital video broadcast) environment using rotational sequences of data modules (e.g., DSMCC carousels). One implementation, described herein, relates to emulating an interactive browsing experience of web content over a broadcast channel.

This functionality may be particularly desirable to the television broadcasting industry because the broadcasted web content is an additional value for their customers. In addition, content provider may pay for the privilege of being broadcast over the broadcaster's network.

Another implementation, described herein, relates to the client device "smartly" caching select portions of the web content being broadcast.

Exemplary Environment

FIG. 1 illustrates an exemplary environment 100 in which the techniques, systems, and other aspects described herein may be implemented. Exemplary environment 100 is a television entertainment system that facilitates distribution of content and web content to multiple viewers. A typical digital video broadcast (DVB) network is an example of such an environment.

The environment 100 includes one or more multimedia content providers 102, one or more web content providers 104, a content distribution system 106, and multiple client devices 108(1), 108(2), ..., 108(N) coupled to the content distribution system 106 via a broadcast network 110.

Typically, the broadcast network 110 is a one-way communications network, where communication occurs only in one direction. If there is a return channel, it is typically a limited channel. However, broadcast communications may occur on a two-way network. For example, this may happen when the return channel is not used or underutilized or when the return channel is impractical for interactivity.

Multimedia content provider 102 includes a content server 112 and stored content 114, such as movies, television programs, commercials, music, and similar audio and/or video content. Content server 112 controls distribution of the stored content 114 from content provider 102 to the content distribution system 106. Additionally, content server 102 controls distribution of live content (e.g., content that was not previously stored, such as live feeds) and/or content stored at other locations to the content distribution system 106.

Web content provider 104 includes a web content manager 116 and a web content server 118. The web content provider 104 may be coupled to a network 120, such as an intranet or the Internet. The provider 104 may acquire web content from this network 120.

Specific to-be-broadcast web content is stored by the web content provider 104 or extracted from the network 120 as needed. This specific to-be-broadcast web content is the content which may be broadcast to client devices 108(1), 108(2), ..., 108(N).

The web content manager 116 analyzes the web content trees of the to-be-broadcast content. It analyzes the dependencies of the tree and produces cache-control instructions. These instructions may be called cache-control metadata. This metadata is sent to the client devices to specify or help the devices determine which portions of the content to store temporarily (e.g., cache). The manager may also be called the analyzer and instruction-producer. Furthermore, portions of the manager are the content acquirer and builder of modules.

The web content manager 116 processes the to-be-broadcast content prior to distribution. It produces data modules containing the to-be-broadcast content and the metadata.

With the manager 116, a user may specify a root URL of the content that the user wishes to be broadcast. Manager may automatically acquire all of the assets that are part of the content tree of that URL.

In one implementation, the manager 116 may have a user interface (UI) to specify the carouselling frequency rate of content. For example, a UI may display a content tree and the user may select how often each portion is carouselled.

The web content server 118 controls distribution of the modules to the content distribution system 106 using, for example, a file transfer protocol (FTP) over a TCP/IP network (e.g., Internet, UNIX, etc.).

Content distribution system 106 includes a broadcast transmitter 128, one or more content processors 130, and one or more web content processors 132. Broadcast transmitter 128 broadcasts signals, such as cable television signals, across broadcast network 110. Broadcast network 110 can include a cable television network, RF, microwave, satellite, and/or data network, such as the Internet, and may also include wired or wireless media using any broadcast format or broadcast protocol. Additionally, broadcast network 110 can be any type of network, using any type of network topology and any network communication protocol, and can be represented or otherwise implemented as a combination of two or more networks.

Content processor 130 processes the content received from content provider 102 prior to transmitting the content across broadcast network 108. A particular content processor 130 may encode, or otherwise process, the received content into a format that is understood by the multiple client devices 108(1), 108(2), ..., 108(N) coupled to broadcast network 110.

The web content processor 132 processes the modules received from web content provider 104 prior to transmission across broadcast network 110. The web content processor 132 generates rotational sequences of the modules for transmission across broadcast network 110. Those rotational sequences may be called carousels. With one implementation, the DSMCC protocol is employed to send the modules using DSMCC protocol. This web content processor 132 may be considered the builder of rotational sequences and the sender of such.

The web content processor 132 places acquired web content (and metadata) into DSMCC carousels. It does so that the content is be repeated at a sufficient frequency to maintain a good end user experience.

Although FIG. 1 shows a single content provider 102, a single web content provider 104, and a single content distribution system 106, exemplary environment 100 can include any number of content providers and/or web content providers coupled to any number of content distribution systems. Furthermore, the functionality of the web content provider and the web content processor may be combined into one system or divided amongst several.

Content distribution system 106 is representative of a headend service that provides web content data, as well as multimedia content, to multiple subscribers. Each content distribution system 106 may receive different modules with different web content based upon the preferences of the end-users of that system. The web content server 118 may create different versions of web content that include different content for respective headend services, and the content distribution system 106 transmits the web content to the multiple client devices 108(1), 108(2), . . . , 108(N). In one implementation, for example, content distribution system 106 utilizes a carousel file system to repeatedly broadcast the web content data over an out-of-band (OOB) channel to the client devices 108.

Client devices 108 can be implemented in a number of ways. For example, a client device 108(1) receives broadcast content from a satellite-based transmitter via a satellite dish 134. Client device 108(1) is also referred to as a set-top box or a satellite receiving device. Client device 108(1) is coupled to a television 136(1) for presenting the content received by the client device (e.g., audio data and video data), as well as a graphical user interface. A particular client device 108 can be coupled to any number of televisions 136 and/or similar devices that can be implemented to display or otherwise render content. Similarly, any number of client devices 108 can be coupled to a single television 136.

Client device 108(2) is also coupled to receive broadcast content from broadcast network 110 and provide the received content to associated television 136(2). Client device 108(N) is an example of a combination television 138 and integrated set-top box 140. In this example, the various components and functionality of the set-top box are incorporated into the television, rather than using two separate devices. The set-top box incorporated into the television may receive broadcast signals via a satellite dish (similar to satellite dish 134) and/or via broadcast network 110. In alternate implementations, client devices 106 may receive broadcast signals via the Internet or any other broadcast medium.

Each client device 108 runs web browser application that utilizes the web content of the carouselled modules. It acquires the web content using DSMCC protocol to fetch content from the carouselled modules. With the web browser application, the end-user may navigate and locate other web content of interest.

From the point-of-view of the end-user, the end-user is interacting with a web server. However, she is not. Instead, the client device fetches portions of the web content from the carousels being broadcast to the device.

The rendering of the web content is performed by the client device. More specifically, it may be performed by the web browser application of the device. The device receives otherwise unaltered web content and displays it with the browser.

Furthermore, the client device may cache portions of the web content to reduce latency of access to the content as it "carousels by."

Exemplary Client Device

FIG. 2 illustrates an exemplary implementation 200 of a client device 108 shown as a standalone unit that connects to a television 136. Client device 108 can be implemented in any number of embodiments, including as a set-top box, a satellite receiver, a TV recorder with a hard disk, a game console, an information appliance, and so forth. Client device 108 includes a wireless receiving port 202, such as an infrared (IR) or Bluetooth wireless port, for receiving wireless communications from a remote control device 204, a handheld input device 206, or any other wireless device, such as a wireless keyboard. Handheld input device 206 can be a personal digital assistant (PDA), handheld computer, wireless phone, or the like. Additionally, a wired keyboard 208 is coupled to communicate with the client device 108. In alternate embodiments, remote control device 204, handheld device 206, and/or keyboard 208 may use an RF communication link or other mode of transmission to communicate with client device 108.

Client device 108 receives one or more broadcast signals 210 from one or more broadcast sources, such as from a satellite or from a broadcast network. Client device 108 includes hardware and/or software for receiving and decoding broadcast signal 210, such as an NTSC, PAL, SECAM or other TV system video signal. Client device 108 also includes hardware and/or software for providing the user with a graphical user interface by which the user can, for example, access various network services, configure the client device 108, and perform other functions.

Client device 108 may be capable of communicating with other devices via one or more connections including a conventional telephone link 212, an ISDN link 214, a cable link 216, an Ethernet link 218, a DSL link 220, and the like. Client device 108 may use any one or more of the various communication links 212-220 at a particular instant to communicate with any number of other devices.

Client device 108 generates video signal(s) 220 and audio signal(s) 222, both of which are communicated to television 136. The video signals and audio signals can be communicated from client device 108 to television 136 via an RF (radio frequency) link, S-video link, composite video link, component video link, or other communication link. Although not shown in FIG. 2, client device 108 may include one or more lights or other indicators identifying the current status of the device. Additionally, the client device may include one or more control buttons, switches, or other selectable controls for controlling operation of the device.

FIG. 3 illustrates selected components of client device 108 shown in FIGS. 1 and 2. Client device 108 includes a first tuner 300 and an optional second tuner 302. These tuners may be called the receiving unit. The tuners 300 and 302 are representative of one or more in-band tuners that tune to various frequencies or channels to receive television signals, as well as an out-of-band tuner that tunes to the broadcast channel over which the web content data is broadcast to client device 108.

Client device 108 also includes one or more processors 304 and one or more memory components. Examples of possible memory components include a random access memory (RAM) 306, a disk drive 308, a mass storage component 310, and a non-volatile memory 312 (e.g., ROM, Flash, EPROM, EEPROM, etc.). Alternative implementations of client device 106 can include a range of processing and memory capabilities, and may include more or fewer types of memory components than those illustrated in FIG. 3. For example, full-resource clients can be implemented with substantial memory and processing resources, including the disk drive 308 to store content for replay by the viewer. Low-resource clients, however, may have limited processing and memory capabilities, such as a limited amount of RAM 306, no disk drive 308, and limited processing capabilities.

Processor(s) 304 process various instructions to control the operation of client device 106 and to communicate with other electronic and computing devices. The memory components (e.g., RAM 306, disk drive 308, storage media 310, and non-volatile memory 312) store various information and/or data such as content, web content data, configuration information for client device 108, and/or graphical user interface information. The device may cache data into any one of these many memory components.

An operating system 314 and one or more application programs 316 may be stored in non-volatile memory 312 and executed on processor 304 to provide a runtime environment. A runtime environment facilitates extensibility of client device 108 by allowing various interfaces to be defined that, in turn, allow application programs 316 to interact with client device 108.

The application programs 316 that may be implemented at client device 108 can include an electronic program guide (EPG), an email program to facilitate electronic mail, and so on.

In the illustrated example, a web browser application 318 is stored in memory 312 to render and display web content. The web browser application 318 displays web content (such as HTML) for which the end-users often navigate using "hypertext" interactivity.

Also stored in memory 312 of this example is a DSMCC protocol handler 317 and DSMCC protocol stack 319.

The protocol handler 317 fetches modules from the DSMCC carousels (e.g., object carousels) using the DSMCC protocol. With the handler 317, the end-user may specify "dsmcc://" instead of "http://" to access web content of the carousels. With such, the relative URLs of the hierarchical web site may be employed seamlessly. The protocol handler 317 may also be called the interface or fetcher.

The protocol stack 319 facilitates communications using the DSMCC protocol.

Client device 108 can also include other components pertaining to a television entertainment system which are not illustrated in this example for simplicity purposes. For instance, client device 108 can include a user interface application and user interface lights, buttons, controls, etc. to facilitate viewer interaction with the device.

Client device 108 also includes a decoder 320 to decode a broadcast video signal, such as an NTSC, PAL, SECAM or other TV system video signal. Client device 108 further includes a wireless interface 322, a network interface 324, a serial and/or parallel interface 326, and a modem 328. Wireless interface 322 allows client device 108 to receive input commands and other information from a user-operated input device, such as from a remote control device or from another IR, Bluetooth, or similar RF input device.

Network interface 324 and serial and/or parallel interface 326 allows client device 108 to interact and communicate with other electronic and computing devices via various communication links. Although not shown, client device 108 may also include other types of data communication interfaces to communicate with other devices. Modem 328 facilitates client device 108 communications with other electronic and computing devices via a conventional telephone line.

Client device 108 also includes an audio/video output 330 that provide signals to a television or other device that processes and/or presents or otherwise renders the audio and video data. This output may be called the display.

Although shown separately, some of the components of client device 108 may be implemented in an application specific integrated circuit (ASIC). Additionally, a system bus (not shown) typically connects the various components within client device 108. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

General reference is made herein to one or more client devices, such as client device 108. As used herein, "client device" means any electronic device having data communications, data storage capabilities, and/or functions to process signals, such as broadcast signals, received from any of a number of different sources.

Smart Caching of Content

Client device may cache some portion of the carouselled content so that the end-user receives faster responses. Doing this helps avoid carousel latency.

With smart caching, a determination is made about which content to keep in the client's cache and how long. This determination may be done by the web content manager 116 or the client device or both. Part of the "smart" nature may be anticipating where a user may browse next.

In addition, there may also be "hooks" that a web content author may include to indicate that specific content should be cached. This may also provide the option to lock some content into the cache.

Methodological Implementations of the Exemplary Interactivity Emulator

Figure 4:
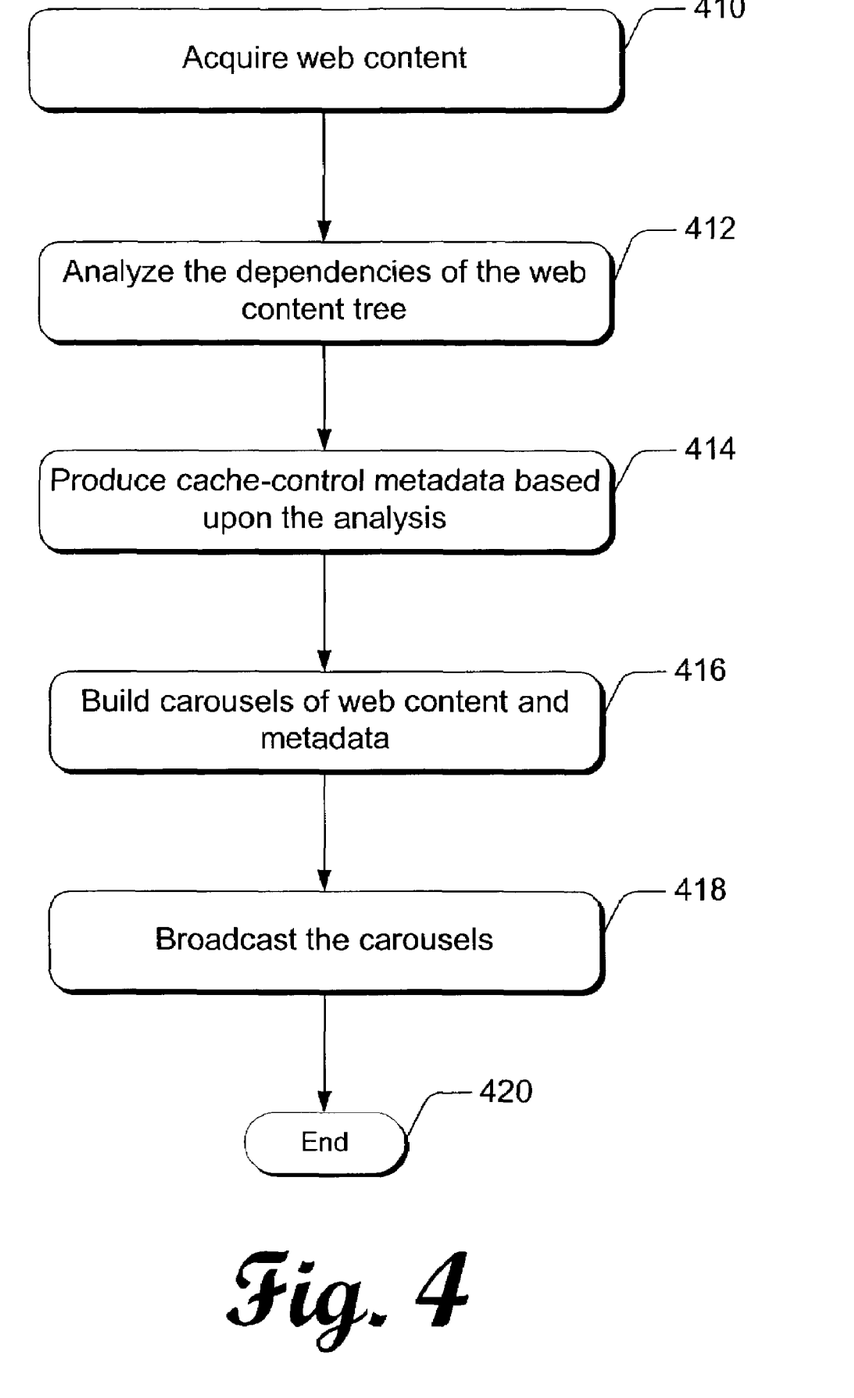
FIGS. 4 and 5 are flow diagrams showing methodological implementations described herein.
Figure 5:
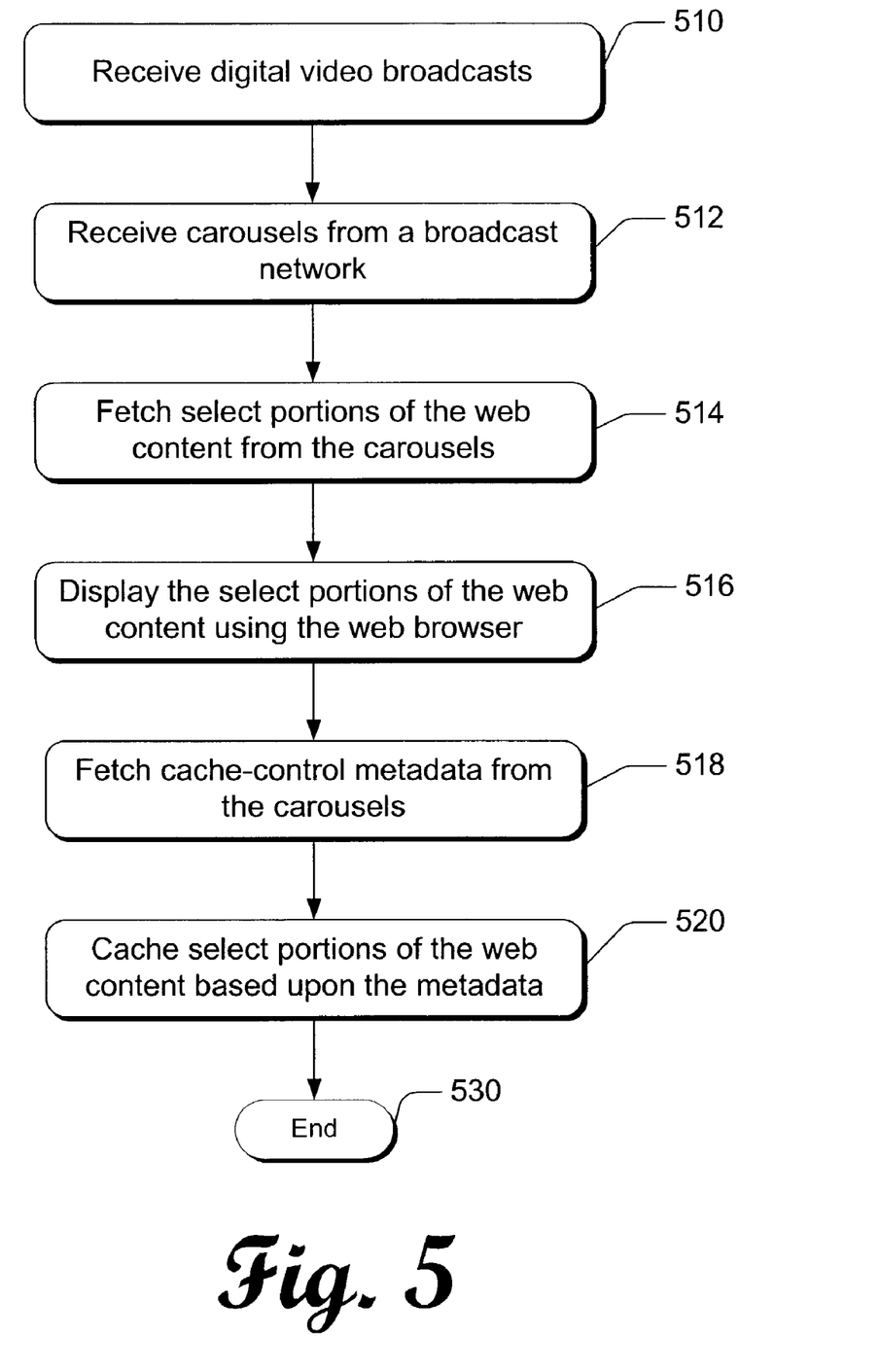

FIGS. 4 and 5 show a methodological implementation of the exemplary interactivity emulator. This methodological implementation may be performed in software, hardware, or a combination thereof.

FIG. 4 shows a methodological implementation of the exemplary interactivity emulator performed by the broadcaster (e.g., web manager 116).

At 410, the exemplary interactivity emulator acquires web content. The content may be acquired from web site on the Internet or from intranets. It may be acquired from internally stored files. Such acquired content may be stored locally.

At 412, it analyzes the dependencies of the web content tree. Such dependencies may be based on how often content is linked.

At 414, the exemplary interactivity emulator produces cache-control instructions based upon the analysis. These may also be called cache-control metadata. This metadata may direct the client device to cache select content and/or select the frequency of the rotation of select content.

At 416, it builds rotational sequences of data modules with the web content and metadata therein. These rotational sequences may also be called "carousels". In one implementation, they may be DSMCC object carousels.

At 418, the exemplary interactivity emulator broadcasts the carousels over a broadcast network to client devices.

The process ends at 420.

FIG. 5 shows a methodological implementation of the exemplary interactivity emulator performed by the receiver (e.g., client device 108).

At 510, the client device receives digital video broadcasts.

At 512, the exemplary interactivity emulator receives one or more rotational sequences of data modules (e.g., carousels) from a broadcast network. These modules include web content and cache-control metadata.

At 514, the exemplary interactivity emulator fetches select portions of the web content from modules. At 516, it displays the select portions of the web content using the web browser.

At 518, the exemplary interactivity emulator fetches cache-control metadata from the modules.

At 520, the exemplary interactivity emulator caches select portions of the web content based upon the metadata.

The process ends at 530.

More Information

The exemplary interactivity emulator may be useful when the network is two-way also. This is particularly true when the return channel from the client device is slow or unreliable. For example, when one expects a website to be suddenly overloaded.

Herein, the terms "web content" refers to content typically transmitted across the Internet or World Wide Web. Typically, that will be a mark-up language, such as HTML. Another example is XML. Hypertext is the typical mechanism for interactively navigating web content.

Herein, examples of rotational sequence of data modules comprises include DSMCC carousels in general. They may specifically include DSMCC data carousels or DSMCC object carousels.

With Minimal Backchannel Feedback

In some instances, the communications network is actually two-way, but only one channel is not used or under-utilized; thereby, making the network effectively a broadcast network. In other instances, the communications network has a slow or delayed backchannel for communicating feedback from the client device.

When the exemplary interactivity emulator is employed, such backchannels are presumably not used or far too slow (or delayed) to provide practical interactivity with the end-user. For example, the backchannel may be a land-based telephone connection made infrequently and unobtrusively (often at night).

With the exemplary interactivity emulator, content being broadcast to a user (or the associated headend) may be varied based upon the backchannel communications.

For example, if the user completes a form, such information may be queued and uploaded to the broadcaster later via the backchannel. That information may be used to modify the content being broadcast to that user.

Computer-Executable Instructions

An implementation of an exemplary interactivity emulator may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer Readable Media

An implementation of an exemplary interactivity emulator may be stored on or transmitted across some form of computer readable media. Computer readable media may be any available media that may be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer architecture comprising: a web content manager configured to:
   acquire web content, wherein the web content manager comprises a user interface displaying a web content tree so that a user can analyze dependencies of the web content utilizing the web content tree and select one or more web assets to be broadcast via a communications network; and
   produce cache-control instructions based upon the user analyzing the dependencies;
   a content distribution system configured to send one or more rotational sequences of data modules via the communications network, wherein the data modules comprise the one or more web assets and the cache-control instructions;
   a client device configured to receive such rotational sequences via the communications network; wherein the client device is further configured to:
   receive the one or more web assets in a digital video broadcast environment;
   fetch the cache-control instructions from the one or more data modules, wherein the cache-control instructions:

help determine selected portions of the web assets to store and how long to temporarily store the selected portions of the web assets; and include one or more hooks indicating specific web assets for caching;

cache the selected portions of the web assets based upon the instructions in anticipation of where a viewer may browse next; and display the selected portions of the web assets.

2. A computer architecture as recited in claim 1, wherein the rotational sequences are selected from a group consisting of DSMCC carousels, DSMCC data carousels, and DSMCC object carousels.

3. A computer architecture as recited in claim 1, wherein the communications network is one-way.

4. A computer architecture as recited in claim 1, wherein the communications network is two-way, but a secondary channel is underutilized, slow, unreliable, or delayed compared to a primary channel.

5. A computer architecture as recited in claim 1, wherein the web content is selected from a group consisting of a markup language, HTML, and XML.

6. A computer architecture as recited in claim 1, wherein client device is further configured to receive digital video broadcasts.

7. A computer architecture as recited in claim 1, wherein client device is further configured to display portions of the web assets of the modules received via the communications network.

8. A broadcast-receiving client device comprising: a processor:

a memory, coupled to the processor, storing computer-executable instructions;

a web browser application configured to render and display web content in a digital video broadcast environment;

an interface configured to receive one or more rotational sequences of data modules from a communications network, wherein one or more of the data modules comprise the web content;

a fetcher configured to fetch cache-control instructions from the one or more data modules and cache select portions of the web content based upon the cache-control instructions prior to a user browsing the web content, wherein the cache-control instructions:

are fetched in order to help determine selected portions of the web content to store and how long to temporarily store the selected portions of the web content; and include one or more hooks indicating specific web content for caching;

a cache configured to store the selected portions of the web content based upon the cache-control instructions anticipating where a user browses; and a user interface display configured to present the selected portions.

9. A device as recited in claim 8, wherein the rotational sequences are selected from a group consisting of DSMCC carousels, DSMCC data carousels, and DSMCC object carousels.

10. A device as recited in claim 8, wherein the communications network is one-way.

11. A device as recited in claim 8, wherein the communications network is two-way, but a secondary channel is underutilized, slow, unreliable, or delayed compared to a primary channel.

12. A device as recited in claim 8, wherein the web content is selected from a group consisting of a markup language, HTML, and XML.

13. A device as recited in claim 8 further comprising a receiving unit configured to receive digital video broadcasts.

14. A device as recited in claim 8 further comprising a display configured to present portions of the web content of the modules received via the communications network.

15. A broadcast-receiving client device comprising:

a processor:

a memory, coupled to the processor, storing computer-executable instructions;

a web browser application configured to render and display web content in a digital video broadcast environment;

an interface configured to receive one or more rotational sequences of data modules from a communications network, wherein one or more of the data modules comprise the web content;

a fetcher configured to fetch cache-control instructions from the one or more data modules, wherein the cache-control instructions:

are fetched in order to help determine selected portions of the web content to store and how long to temporarily store the selected portions of the web content; and include one or more hooks indicating specific web content for caching;

a cache configured to store the selected portions of the web content for later use based upon the cache-control instructions.

16. A digital video broadcasting client device comprising:

a processor:

a memory, coupled to the processor, storing computer-executable instructions;

a web browser application configured to render and display web content in a digital video broadcast environment via a graphical user interface;

a receiving unit configured to receive digital video broadcasts;

an interface configured to receive one or more rotational sequences of data modules from a communications network, wherein one or more of the data modules comprise the web content;

a fetcher configured to fetch cache-control instructions from the one or more data modules, wherein the cache-control instructions:

are fetched in order to help determine selected portions of the web content to store and how long to temporarily store the selected portions of the web content; and include one or more hooks indicating specific web content for caching;

a cache configured to store the selected portions of the web content based upon the cache-control instructions in anticipation of where a user may browse next; and a display configured to present the selected portions of the web content.

17. A device as recited in claim 16, wherein the rotational sequences are selected from a group consisting of DSMCC carousels, DSMCC data carousels, and DSMCC object carousels.

18. A device as recited in claim 16, wherein the communications network is one-way.

19. A device as recited in claim 16, wherein the communications network is two-way, but a secondary channel is underutilized, slow, unreliable, or delayed compared to a primary channel.

20. A device as recited in claim 16, wherein the web content is selected from a group consisting of a markup language, HTML, and XML.

21. An interactive emulation method comprising:
acquiring web content at a web content manager, wherein the web content manager comprises, in a digital broadcast environment, a user interface;
analyzing dependencies of the web content utilizing a web content tree, wherein:
the web content tree comprises:
a root uniform resource locator (URL); and
additional web assets that build on the root URL; and
analyzing the dependencies comprises displaying the web content tree via the user interface so that a user can select one or more web assets to be broadcast via a communications network, wherein the user can specify how often the one or more web assets are to be broadcast;
producing cache-control instructions based upon analyzing the dependencies;
building carousels of the one or more web assets and cache-control instructions;
broadcasting the carousels in one or more rotational sequences of data modules;
receiving, at a client device, the one or more rotational sequences of data modules via the communications network, wherein the one or more rotational sequences of data modules include at least one of the one or more web assets;
fetching the cache-control instructions from the data modules prior to a client device user browsing the web content, wherein the cache-control instructions:
help determine selected portions of the one or more web assets to store;
help determine how long to temporarily store the selected portions of the one or more web assets; and
include one or more hooks indicating specific one or more web assets for caching;
caching the selected portions of the one or more web assets based upon the fetched cache-control instructions in anticipation of where a client device user may browse next; and
displaying the selected portions of the web assets.

22. A method as recited in claim 21, wherein the rotational sequences are selected from a group consisting of DSMCC carousels, DSMCC data carousels, and DSMCC object carousels.

23. A method as recited in claim 21, wherein the communications network is one-way.

24. A method as recited in claim 21, wherein the communications network is two-way, but a secondary channel is underutilized, slow, unreliable, or delayed compared to a primary channel.

25. A method as recited in claim 21, wherein the one or more web assets are selected from a group consisting of a markup language, HTML, and XML.

* * * * *